United States Patent [19]

Neyroud et al.

[11] 4,289,957
[45] Sep. 15, 1981

[54] READING STROKE CODES

[75] Inventors: Jean Neyroud, Saint Martin d'Heres; Francois Ollivier, Meylan, both of France

[73] Assignee: La Telemecanique Electrique, France

[21] Appl. No.: 30,796

[22] Filed: Apr. 17, 1979

[30] Foreign Application Priority Data

Apr. 19, 1978 [FR] France .............................. 78 11471

[51] Int. Cl.$^3$ .................. G06K 7/10; G06K 7/14; G06K 9/00
[52] U.S. Cl. .................................. 235/462; 235/467; 235/454; 340/146.3 K
[58] Field of Search ...................... 235/462, 454, 467; 250/566, 568; 340/146.3 H, 146.3 Z

[56] References Cited

U.S. PATENT DOCUMENTS

| | | | |
|---|---|---|---|
| 3,106,706 | 10/1963 | Kolanowski | 340/146.3 K |
| 3,553,437 | 1/1971 | Boothroyd | 235/462 |
| 3,818,444 | 6/1974 | Connell | 235/467 |
| 3,852,573 | 12/1974 | Dolch | 235/456 |
| 3,916,158 | 10/1975 | Sansone | 235/467 |
| 3,970,825 | 7/1976 | Plockl | 235/467 |
| 4,097,729 | 6/1978 | Seligman | 235/467 |
| 4,122,352 | 10/1978 | Crean | 235/454 |

Primary Examiner—Robert M. Kilgore
Attorney, Agent, or Firm—William A. Drucker

[57] ABSTRACT

The reading of an identification card with stroke code comprises sweeping of a control area by a laser beam, detection by photo-detectors of light reflected by the card and from the edges thereof, amplification, selection by a chronometer of the useful signal, placing of the signal into a buffer memory, and treatment by a microprocessor and an ordinator for reconstitution of a complete message by means of two successive incomplete sweeps comprising at least one upper or lower security character.

5 Claims, 2 Drawing Figures

READING STROKE CODES

BACKGROUND OF THE INVENTION

The invention relates to the reading of a piece of information coded in accordance with a code of strokes.

It is known that these codes are constituted by a succession of reflecting strokes, for example black and white, of different widths and that the reading of this information from the support is carried out by optical-electronic detection of a luminous ray reflected by the support. The code defines a certain number of utility characters and security characters corresponding to the images of the support.

In certain applications, for example the reading "on the run" of an identification pass carried by the user which traverses a control area, or by a package transported on a conveyor belt, the presentation of the card in movement is such that, in the course of successive sweeps carried out by the reading device, the luminous beam, when it has a constant direction, traverses the card in a position which is inclined with respect to the strokes, so that only a part of the strokes is traversed at each sweep.

A known solution for alleviating this inconvenience consists in carrying out a sweep of variable inclination. This process leads to a correct reading, but is very onerous because it requires the employment of a complex optical-mechanical sweeping device, of difficult manufacture.

OBJECT OF THE INVENTION

The invention has for its object a process of reading which permits the use of a conventional sweeping device comprising for example two mirrors in rotation about two mutually perpendicular axes.

SUMMARY OF THE INVENTION

The process according to the invention consists essentially of carrying out a sweep having two mutually perpendicular components, the sweep along one of these components being carried out at a speed such that the support in movement undergoes a small number of sweeps (preferably equal to two), of collecting the portions of signals originated in the course of pairs of successive sweeps, and of selecting those of said portions which comprise at least one upper or lower security character and a number of utility characters at least equal to a predetermined fraction (preferably ½) of the total number of utility characters of the support, and associating, for the reconstitution and decoding of the complete messages, couples of two selected successive portions of signal of which one comprises an upper security character and the other a lower security character.

Other features, as well as the advantages of the invention, will appear clearly from the following description.

DESCRIPTION OF THE PREFERRED EMBODIMENT

Figure 1:
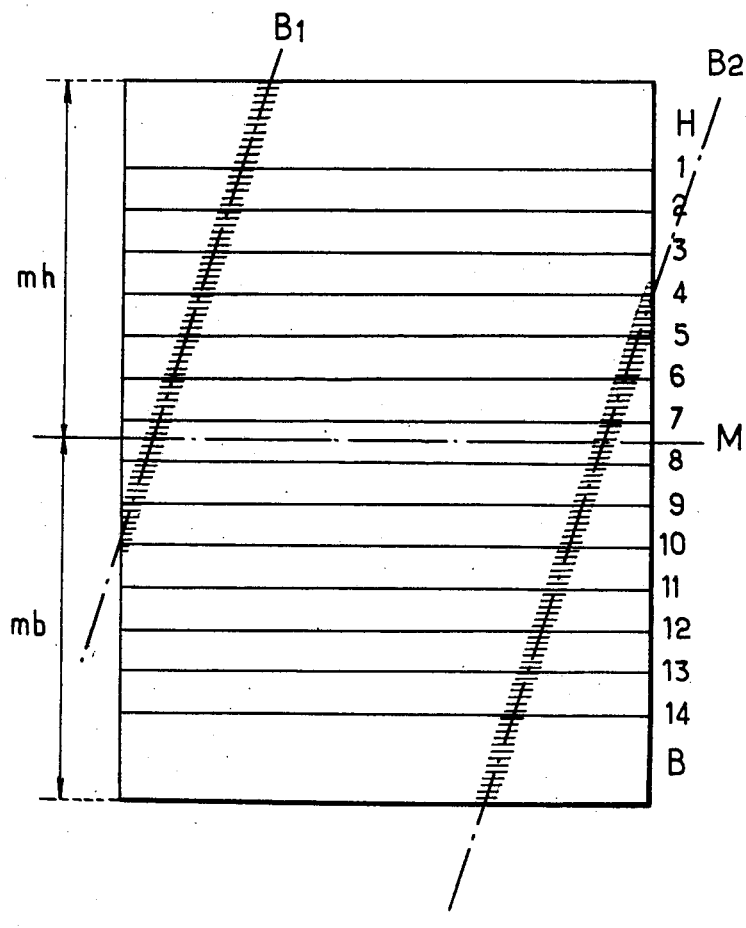
FIG. 1 shows an identification label on which the information is coded in a code of strokes.

In FIG. 1 there is shown, by way of example, a personal identification pass of dimensions 120 × 90 mm., on which information is coded in accordance with a code of strokes, derived from the UPC code and constituted by a succession of black strokes (representing a binary value 1) and white strokes (representing a binary value 0) of different widths, counted in "units" defined by the height of the smallest black or white stroke.

An upper security character (H) comprises ten units and is followed by seven utility characters numbered 1 to 7 in the drawing, and each comprising seven units. Further, a central security character (M) comprises five units and is itself followed by seven utility characters numbered 8 to 14 in the drawing and each comprising 7 units. Finally, a lower security character (B), comprising ten units, terminates the message of one hundred and twenty three units, which is thus composed of an upper half-message (mh) and a lower half-message (mb).

Figure 2:
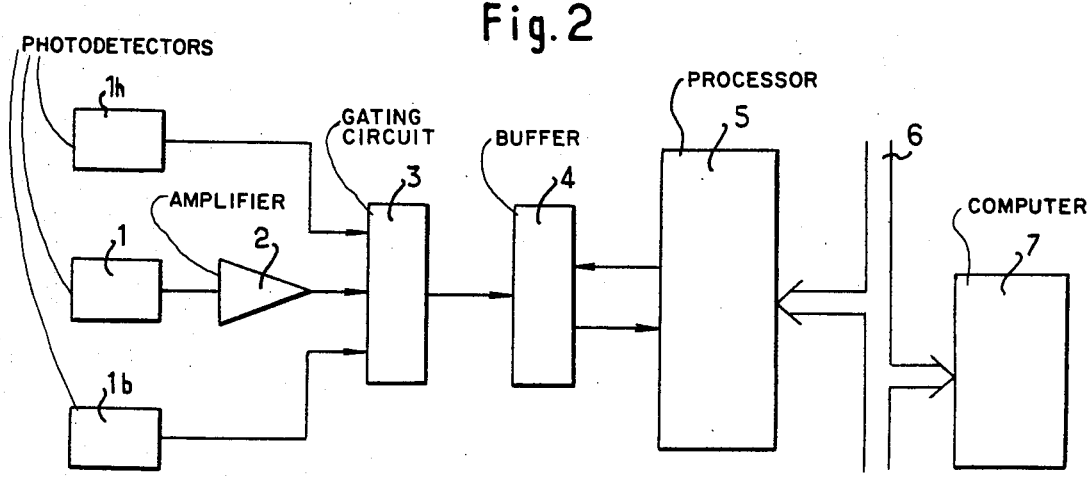
FIG. 2 is a general schematic of a reading device according to a preferred method of carrying out the invention.

When it is desired to make a check at random, there is used for this purpose the luminous energy reflected by the pass, illuminated by a laser beam which sweeps the control area (the device for emission and sweeping, known per se, has not been shown). The light reflected is received by a photo-detector (1, FIG. 2), and the electrical signal received, amplified by a component 2, is presented in the form of a continuous series of characters each composed of seven positive or negative peaks (for the utility characters) or of ten or five peaks (for the security characters).

The sweep has a horizontal component which corresponds for example to a time of 250 ms to travel over the width of the control area, and a rapid vertical component which corresponds for example to a time of 5 ms. to travel the length of the pass.

The pass, carried by the user, is moved in the control area at a speed of the order of one meter per second, so that it is swept at least twice. FIG. 1 shows in chain-dotted line two sweeps B1 and B2 which will be generally oblique with respect to the pass, so that each of them will only be able to concern a part of the information to be decoded. If B1 is carried out from top to bottom, B2 is carried out from bottom to top.

The process of the invention consists in selecting the sweeps for which the signal originated by the photo-detector comprises at least one upper or lower security character and seven utility characters, and to associate two portions of signal corresponding to two successive incomplete such sweeps. Of course, if the portion of the signal resulting from a sweep comprises fourteen utility characters, it gives the whole of the information and need not be associated with another portion of signal.

The device for the carrying out of this process comprises (FIG. 2) a chronometer 3 coupled to the output of the amplifier 2 and to the outputs of two auxiliary photo-detectors 1h and 1b disposed in such a manner as to detect respectively the upper and lower edges of the pass card, that is to say to provide a signal when the laser beam reaches the said edges.

The chronometer 3 feeds a buffer memory 4 itself coupled to a slave micro-processor 5. This latter is interconnected by a bus bar 6 to a central master ordinator 7 which administers a certain number of local control units of the same type.

The sweeping of a "unit" lasting several microseconds, the micro-processor is in effect not rapid enough to carry out the treatment of the signal unit by unit and that is why there is used a buffer memory having a sufficient capacity to store the content of two successive readings. The micro-processor thus deals with the portions of signal corresponding to two successive incomplete sweeps. This treatment consists of counting the number of utility characters which succeed a security character. If this number is equal to fourteen, the message is complete and is directly transferred to the central ordinator, which decodes it. If it is less than seven, the incomplete message is repeated and the micro-processor treats the following message. If it is comprised between seven and thirteen, it is necessary again to check for the presence of a security character in the "half message", which the micro-processor does by a marginal operation of identification by counting the number of units of the half-message, which is greater for a security character than for a utility character, and by rejecting incomplete messages which do not comprise a security character. It is furthermore necessary to associate a half-message mb, comprising a signal issued from the photo-detector 1b, to a half-message mh, comprising a signal issued from the photo-detector 1h. This function is likewise fulfilled by the micro-processor.

It will be noted that as the functions of the micro-processor consist of decodings, countings and comparisons, they could be carried out by conventional circuits.

The chronometer 3 is arranged to select the signal which corresponds to the sweeping of the pass card (and not reflections occurring outside the card). The buffer memory 4 thus only contains the useful signal, received between the predetermined moments in time by the photo-detectors 1b and 1h.

In short, the central ordinator deals with complete messages according to a classic process of decoding. These messages comprise, before their pre-treatment in the micro-processor, a redundant part (FIG. 1) which is easy to eliminate. In effect, this part is, for each half-message, that which follows the security character M (centre of the support). The micro-processor will thus be programmed to eliminate the characters which follow the character M and which precede the arrival of a new character H or B.

It should be noted that the process of reading described above gives a high probability of restitution of the whole of the information contained in a support wherein the information is presented in the form of a coding in strokes even when, the relative position of the support being less than satisfactory, each sweep only delivers an incomplete message. It would be possible to increase this probability by associating together the incomplete message corresponding to more than two successive sweeps, but at the cost of a complication of the device. It would likewise be possible, by way of variation, to select all of the portions of the useful signal for which there is presented a character B or Ha and a character M, the counting of the utility characters then not being necessary.

Finally, it is clearly not strictly necessary to use two processors respectively to select the half-messages and to decode the complete messages. This hierarchical structure does however, possess the advantage of permitting the use of simple means at a local control post and to supply to a central ordinator a message which only requires the same treatment as those which are provided by fixed control posts of the type requiring passing through or insertion of the card.

The invention is applicable to the reading of any stroke code, whether continuous or discrete, in which the ratios of width between the black and white strokes are maintained when the direction of sweep varies.

We claim:

1. In a process of reading, from a movable support having lower and upper margins and a data field, of data and security characters recorded in said field and said margins respectively and coded in accordance with a bar code, of the kind comprising the steps of:
    (i) using a scanning light beam to carry out first and second sweeps onto the support in movement, said sweeps having a constant direction, the first sweep being carried out from top to bottom of the support and the second sweep being carried out from bottom to top
    (ii) detecting the light reflected by said support to provide a signal comprising data characters and lower and upper security characters corresponding to said data field and said lower and upper margins respectively and
    (iii) decoding these data and security characters by comparison of the relative widths of the bars and the intervals between the bars, the improvement that
    (a) the process comprises the step of proceeding to the collecting of those portions of the said signal which originate in the course of pairs of successive sweeps and to the selection of those of the said signal portions which comprise at least one upper or lower security character and a number of data characters at least equal to half of the total number of data characters in the said data field, and
    (b) the process further comprises the step of associating for the purpose of reconstitution and decoding of the complete data, couples of two selected successive signal portions of which one comprises an upper security character and the other a lower security character.

2. A process, according to claim 1 wherein the selection takes place by counting the number of data characters which follow each security character.

3. A process, according to claim 1, used with a support having a "central" security character, comprising the further step of elimination, in each selected portion of signal, of the data characters which follow a "central" security character.

4. A device for carrying out the process of claim 1, comprising a receiving amblifier, two auxiliary detectors arranged to detect respectively the upper and lower edges of the support, gating means coupled to the said receiving amplifier and controlled from the said auxiliary detectors, for selecting those portions of the signal which are received by the receiving amplifier during the sweeps of support.

5. In a process of reading, from a movable support having lower and upper margins and a data field, of data and security characters recorded in said data field and said margins respectively, the support further having a central security character, each of said data and characters being coded in accordance with a bar code, of the kind comprising the steps of:
    (i) using a scanning light beam to carry out first and second sweeps onto the support in movement, said sweeps having a constant direction, the first sweep being carried out from top to bottom of the support and the second sweep being carried out from bottom to top (ii) detecting the light reflected by said support to provide a signal comprising data characters and lower, upper and central security characters and (iii) decoding these data and security characters by comparison of the relative widths of the bars and the intervals between the bars, the improvement that (a) the process comprises the step of proceeding to the collecting of those portions of the said signal which originate in the course of pairs of successive sweeps and to the selection of those of the said signal portions in which one lower or upper security character and the central security character are present, and (b) the process further comprises the step of associating for the purpose of reconstitution and decoding of the complete data, couples of two selected successive signal portions of which one comprises an upper security character and the other a lower security character.

* * * * *